April 1, 1958

P. C. DURLAND 2,828,588

WORKHOLDER APPARATUS FOR AXIAL CLAMPING
AND RADIAL LOADING OF WORKPIECES

Filed March 21, 1957

INVENTOR
*Philip C. Durland*

BY *Sughrue and Rothwell*

ATTORNEYS

April 1, 1958 P. C. DURLAND 2,828,588
WORKHOLDER APPARATUS FOR AXIAL CLAMPING
AND RADIAL LOADING OF WORKPIECES
Filed March 21, 1957 2 Sheets-Sheet 2
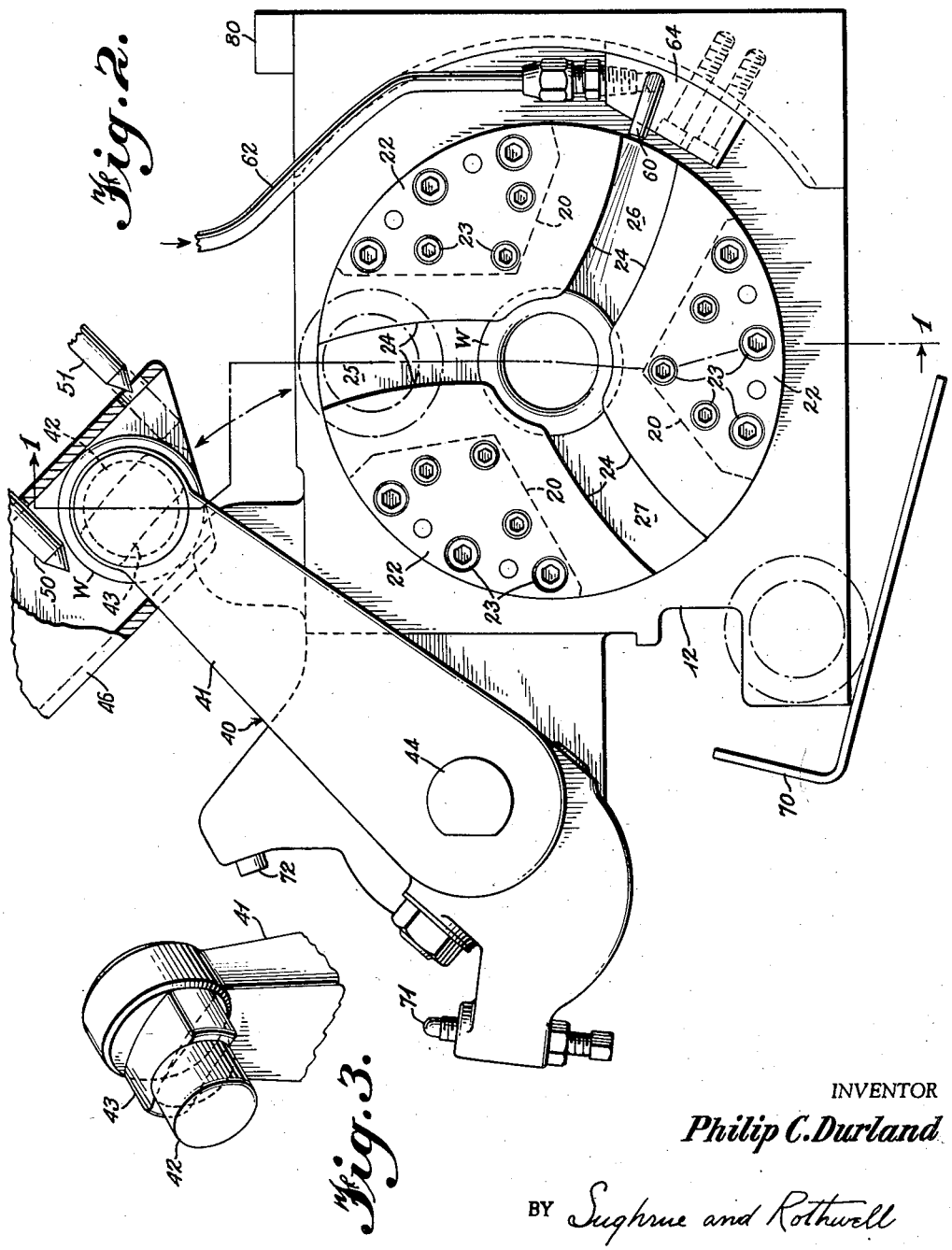
INVENTOR
Philip C. Durland
BY Sughrue and Rothwell
ATTORNEYS

2,828,588

WORKHOLDER APPARATUS FOR AXIAL CLAMP-ING AND RADIAL LOADING OF WORKPIECES

Philip C. Durland, Springfield, Vt., assignor to Bryant Chucking Grinder Company, Springfield, Vt.

Application March 21, 1957, Serial No. 647,629

14 Claims. (Cl. 51—215)

This invention relates to a workholder device for an internal grinding machine, and more particularly to a workholder arranged for axial workpiece clamping and radial workpiece loading.

Workholding devices or chucks for grinding machines normally center the workpiece in concentric relationship to the axis of a headstock spindle by means of radially movable jaws which exert a holding force applied radially to the outside perimeter of the workpiece. In automatic grinding machines there is further provided a means for automatically loading and ejecting workpieces from the chuck. A machine of this general nature is shown in the U. S. Patent 2,671,293 to Grobey. Because of the configuration of the perimeter of certain workpieces, it is often difficult to use radial clamping chucks, and where the workpiece is of a comparatively frail cross section, the clamping forces of the jaws are apt to cause distortion. Examples of workpieces having this type of cross-section are the annular races of antifriction bearings. Hence, in such cases it is expedient to hold the workpieces by clamping in an axial direction between opposing surfaces normal to the axis of the headstock spindle. This further necessitates loading the workpiece between the axial clamping surfaces in a radial direction.

It is, therefore, an object of this invention to provide a workholder with axial clamping means and further to provide such a workholder with means for loading and removing a workpiece in a plane normal to the axis of the headstock spindle.

It is a further object of this invention to provide a loading device that introduces a workpiece and centers it coaxially with the axis of the rotating headstock spindle.

An additional object of this invention is to provide means independent of the loader for removing the workpieces from the workholder.

Other objects and advantages will be apparent from the following description taken in conjunction with the accompanying drawings, which show a preferred embodiment.

In the drawings:

Figure 2 is an end elevation of the side loading workholder, the pneumatic ejector and the loader arm; and Figure 3 is an enlarged perspective view of the loader arm pin.

Figure 1:
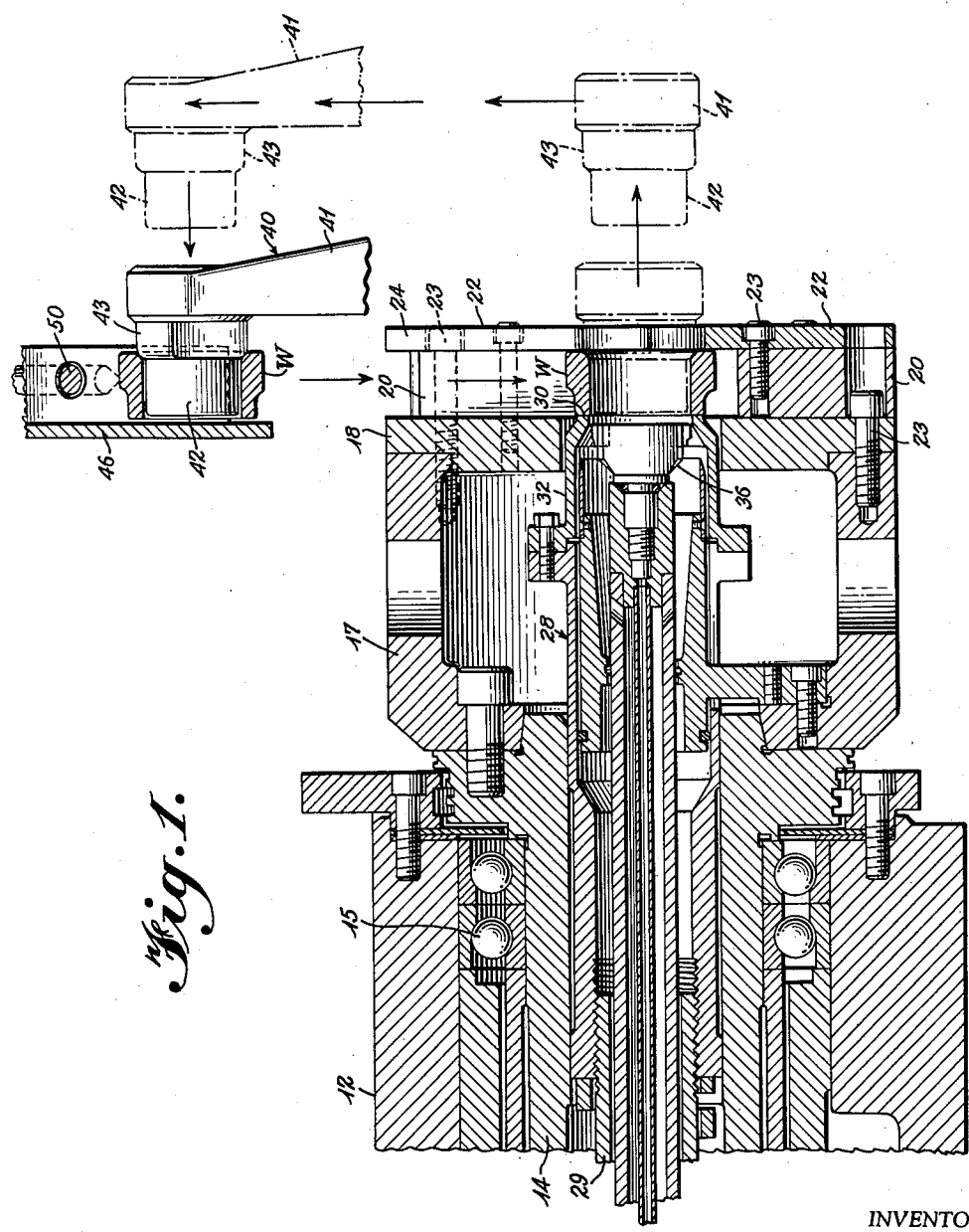
Figure 1 is a sectional view on line 1—1 of Figure 2 showing the radial loading axial clamping workholder and the loader arm of this invention.

Referring to the drawings, an internal grinding machine includes a head 12 suitably supported on a base. A rotatable spindle 14 is suitably journalled in the head by bearing 15. A workholder assembly is rigidly attached to the rotary spindle 14. This assembly includes a workholder body 17, mounting member 18, spacer plates 20 and clamping plates 22, all rigidly secured together by suitable cap screws 23. The clamping plates 22 provide surface portions 24 facing inwardly for engaging the outer end face of an annular workpiece W. The spacer plates 20 and clamping plates 22 are formed as circular sectors with the clamping plate sectors larger as shown in Figure 2, thereby forming unobstructed paths or channels 25, 26 and 27 for moving a workpiece into and out of the workholder assembly, in a plane normal to the axis of rotation of the assembly.

A plunger assembly 28 is mounted for axial movement within the spindle, and for rotary movement with the spindle. The plunger assembly includes a stem 29 and an end portion 32 having an annular work engaging face 30. This work engaging face is for the purpose of engaging an inner and opposite end face of the workpiece W. The plunger assembly is preferably made tubular to provide access from the rear of the headstock for introducing auxiliary devices; such as coolant conduit, elements of work size gauging means 36, etc. The plunger 28 and plunger face 30 are moved axially against said inner end face to clamp the workpiece against the portions 24 of the clamping plates 22. To unclamp the workpiece, the plunger assembly is moved to the left from the position shown in Figure 1 by a suitable mechanism, not shown. One such mechanism which may be used for axially moving the rotatable plunger is disclosed in the patent to Bryant et al., No. 2,585,533.

A loader assembly 40 includes a loader arm 41, carrying a loader pin 42 on its outer end, the loader pin 42 has a narrow neck portion 43 which will clear the slots 25, 26 and 27. The arm is mounted on an actuating rod 44 for pivotal and axial movement about and along the axis of this rod. These movements are imparted to the rod by a suitable mechanism such as shown in the patent to Grobey, No. 2,671,293. A plurality of workpieces W are loaded in loader chute 46 and are picked up from the lower end of the loader chute by means of the loader pin 42.

A dividing and workpiece separating arrangement includes pin 50 and another pin 51. When the loader pin 42 is moved to the position shown in Figures 1 and 2, the pin 50 is moved into intercepting position within the chute 46, while pin 51 is retracted. When loader arm 41 swings downward to load the workpiece in the workholder, the pins 50 and 51 are moved to reverse positions, that is, pin 50 is retracted while pin 51 is projected into intercepting position within the chute 46, thus permitting another workpiece to move to a position in the chute and to rest against pin 51.

Means are provided for augmenting the force of gravity in ejecting a workpiece after it has been ground. These means include an air nozzle 60 at the end of an air conduit 62. The nozzle is directed at the workpiece when in clamped position as shown in Figure 2. The nozzle is mounted by means of bracket 64. An ejector chute 70 is provided for the purpose of catching the ejected workpieces.

Suitable means are provided for stopping the spindle 14 and therefore the channels 25, 26 and 27 in any predetermined position, such as a position which allows loader arm pin 42 to move a workpiece W through any of the channels 25, 26 or 27. A mechanism for stopping the spindle is indicated generally at 80 and the mechanism, per se, forms no part of the present invention. One such mechanism which could be utilized to stop the spindle in the predetermined position is shown in the patent to Arms et al., No. 2,626,534, on Sheet 5 of the drawings and in column 4 of the specification, line 61, et seq.

In operation: With loader arm 41 in the position shown in Figure 2 the loader pin 42 is inserted in the hole of the lowermost of a plurality of workpieces loaded in the chute 46. The divider pin 50 in the position shown prevents the workpieces above it from sliding downwards while the divider pin 51 is retracted to leave an unobstructed path for the loader arm 41 in its downward swinging movement. The plunger 28 is caused to retract towards the left as viewed in Figure 1, relieving the clamping pressure on the workpiece in the chuck, allowing the workpiece to roll down slot 27 by gravity, augmented by the air stream from nozzle 60 directed along slot 26. The arm 41, carrying a workpiece, is now caused to swing clockwise until an adjustable stop 71 on the arm contacts an anvil 72 fixedly attached to head 12. In this position, the axis of pin 42 is colinear to the axis of spindle 14, thus placing the annular workpiece thereon in the desired coaxial relationship to spindle 14. Plunger 28 now moves to the right, clamping the workpiece between faces 24 and 30, while simultaneously arm 41 moves axially toward the right until pin 42 is entirely outside the workpiece. At this time the divider pin 50 is retracted from the chute 46 and divider pin 51 is projected into the chute, thus causing a new workpiece to be presented at the bottom position of the chute. In the meantime, the loader arm continues its movement and swings upwardly to its uppermost position and then moves axially to the left, inserting the pin 42 in the hole of the bottom workpiece. During the last fractional part of the axial movement of the loader arm, the pins 50 and 51 are again caused to take the positions shown in Figure 2 and the loader arm comes to rest, ready to repeat the above-described cycle of operation.

It can be seen from the above description, the applicant has disclosed a novel and improved apparatus for axial clamping, and arranged for loading and ejecting workpieces in a side loading workholder of an internal grinding machine. The preferred embodiment was shown for the purpose of illustration only and the applicant claims a full range of equivalents which will be apparent to one skilled in the art and is within the scope of the appended claims.

What is claimed is:

1. In an internal grinding machine: a rotary spindle; means carried by said spindle to engage a radial end face of an annular workpiece; a rotatable work engaging plunger carried for coaxial rotation with said spindle and movable axially thereto, said plunger adapted to engage an opposite radial end face of said annular workpiece; and a loader arm mechanism movable between a position to positively engage an unground workpiece and a predetermined position to deposit the unground workpiece between said work engaging plunger and said means on said spindle engaging said workpiece with the axis of the workpiece coaxial with the axis of said spindle, the loader arm, rotatable work-engaging plunger, and the means on the rotary spindle providing the sole means for centralizing the workpiece coaxial with the spindle axis.

2. An apparatus as defined in claim 1 wherein said means carried by said spindle provide a plurality of unobstructed paths for moving said workpiece in a plane perpendicular to the axis of rotation, at the point where the workpiece is held by said plunger and said means.

3. An apparatus as defined in claim 2 including pneumatic means for ejecting said workpiece through one of said unobstructed paths.

4. An apparatus for automatic side loading and ejecting workpieces from an internal grinding machine comprising: a rotary spindle member having a work engaging face adapted to engage a radial end face of an annular workpiece; an axially movable plunger mounted for rotation together with the spindle, said plunger having a work engaging face adapted to engage an opposite radial end face of said annular workpiece; means defining a plurality of unobstructed paths between said work engaging faces for allowing movement of a workpiece in a plane normal to the axis of rotation; and a loader arm movable in a direction substantially parallel to the axis of rotation for picking up an unground workpiece and movable in said normal plane through one of said unobstructed paths for depositing said workpiece between said work engaging faces with its axis coaxial with the axis of the spindle.

5. An apparatus as defined in claim 4 wherein said loader arm includes a pin for engaging the hole in an annular workpiece and further comprising means for moving said loader arm axially away from said work engaging faces after said workpiece has been deposited between said faces.

6. An apparatus as defined in claim 5 further comprising means for stopping said spindle in a predetermined position, to allow said loader arm pin and workpiece to move in one of said unobstructed paths.

7. An apparatus for automatic loading and ejecting of annular workpieces from an internal grinding machine workholder assembly comprising: a rotary spindle; a plurality of sector-shaped spacing plates secured to the end face of said spindle; a plurality of sector-shaped clamping plates secured over said spacing plates and thereby forming a plurality of unobstructed channels on the face end of said spindle, said clamping plates having an inwardly directed clamping surface adapted to engage a radial end face of an annular workpiece; a plunger coaxial with said spindle and movable axially relative thereto; an annular work engaging face on said plunger for engaging an opposite radial end face of said annular workpiece; an axially and pivotally movable loader arm, a loader pin secured to said loader arm and directed toward the workholder assembly; means for stopping said spindle in a predetermined position; a loader chute for holding a plurality of unground workpieces, means for moving said loader arm pin to pick up a workpiece from said loader chute, deposit a workpiece between the work engaging faces coaxial with said spindle, move axially away from the workpiece, and move back to the original position; and an air blast nozzle for exerting a pneumatic pressure on an unclamped workpiece to eject the workpiece away from the work engaging faces through one of said channels.

8. A device as defined in claim 7 further including two dividing pins intermittently and alternatively insertable into said loader chute.

9. In an internal grinding machine: a rotatable workholder assembly, said assembly including axially movable means to clamp a workpiece while grinding the same; means defining a plurality of unobstructed paths in said workholder assembly; and loader means for positively engaging a workpiece and moving said workpiece through one of said paths into work clamping position.

10. A grinding machine as defined in claim 9 and further including pneumatic means for ejecting a workpiece when it is unclamped by said workholder assembly.

11. In an internal grinding machine having a rotatable tubular headstock spindle, means to arrest the rotative movement of said spindle in a predetermined angular position, a work loader with a loading arm movable pivotally from a first initial position defined by the chute of a hopper to a second position defined by the axis of the spindle, an apparatus comprising: a workholder on said spindle; spacer plates on the face of said workholder angularly located to form at least two first channel portions unobstructed from the center to the perimeter of said workholder; clamping plates covering said spacer plates angularly spaced to form in same manner unobstructed second channel portions parallel with and of less width than first said channel portions, said clamping plates having inwardly-directed surface portions adapted to engage an outer end face of an annular workpiece; and a plunger within said spindle axially movable relative thereto, said plunger having an annular face adapted to engage an opposite end face of said workpiece and to clamp the same axially against said inwardly-directed surface portions.

12. A device as defined in claim 11 wherein said loader arm carries an axially inwardly directed loading pin with a perimeter substantially conforming to the interior walls of an annular workpiece, said pin angularly movable through one of said channels from said first position with the axis of the pin substantially coaxial with the axis of a workpiece in a location defined by said chute to said second position with the axis of the pin substantially coaxial with the axis of the spindle.

13. A device as defined in claim 12 wherein said pin in its second position is arranged for a first outwardly directed movement to a location where its extreme is placed outside said clamping plates, and a subsequent second pivotal movement to the angular location of said first position, and finally a third movement in axial direction opposite the direction of the said first movement to its said first initial position.

14. A device as defined in claim 13 wherein a predetermined angular position of the spindle one of said channels formed by said portions presents an unobstructed ingress path from the perimeter to the center of said workholder, for said loading pin, and a second channel presents an unobstructed egress path for a workpiece affected by gravity, and means to introduce an air blast to said workholder for the purpose of augmenting the gravitational force.

References Cited in the file of this patent

UNITED STATES PATENTS

| | | |
|---|---|---|
| 1,412,170 | Dixon | Apr. 11, 1922 |
| 2,398,659 | Mead | Apr. 16, 1946 |

FOREIGN PATENTS

| | | |
|---|---|---|
| 578,284 | Great Britain | June 21, 1946 |